United States Patent
Li et al.

(10) Patent No.: US 12,429,883 B2
(45) Date of Patent: Sep. 30, 2025

(54) METHOD FOR PATH PLANNING, AUTOMATIC GARDENING DEVICE, AND COMPUTER PROGRAM PRODUCT

(71) Applicant: Willand (Beijing) Technology Co., LTD., Beijing (CN)

(72) Inventors: Chunhong Li, Beijing (CN); Degan Lin, Beijing (CN)

(73) Assignee: Willand (Beijing) Technology Co., LTD., Beijing (CN)

( * ) Notice: Subject to any disclaimer, the term of this patent is extended or adjusted under 35 U.S.C. 154(b) by 347 days.

(21) Appl. No.: 18/152,850

(22) Filed: Jan. 11, 2023

(65) Prior Publication Data
US 2023/0221731 A1    Jul. 13, 2023

(30) Foreign Application Priority Data
Jan. 11, 2022    (CN) .......................... 202210029314.9

(51) Int. Cl.
G05D 1/00    (2024.01)
A01D 34/00    (2006.01)
A01D 101/00    (2006.01)

(52) U.S. Cl.
CPC ......... *G05D 1/0274* (2013.01); *A01D 34/008* (2013.01); *G05D 1/0044* (2013.01); *G05D 1/0219* (2013.01); *A01D 2101/00* (2013.01)

(58) Field of Classification Search
CPC .. G05D 1/0274; G05D 1/0044; G05D 1/0219; G05D 1/0214; G05D 1/0223; A01D 34/008; A01D 2101/00; G01C 21/20
See application file for complete search history.

(56) References Cited

U.S. PATENT DOCUMENTS

2012/0101725 A1*    4/2012    Kondekar ............ G05D 1/0219
                                                                        701/445

FOREIGN PATENT DOCUMENTS

| CN | 109634287 A | 4/2019 |
|----|-------------|--------|
| CN | 113359699 A | 9/2021 |

(Continued)

OTHER PUBLICATIONS

Nielsen Lasse Damtoft et al: "Convex Decomposition for a Coverage Path Planning for Autonomous Vehicles: Interior Extension of Edges", Sensors 2019, vol. 19, No. 19, Sep. 25, 2019 (Sep. 25, 2019), p. 4165, XP093021914, DOI: 10.3390/s19194165 *p. 2-p. 4; figures 3,4,6 *.

(Continued)

*Primary Examiner* — Yuen Wong
(74) *Attorney, Agent, or Firm* — Emerson, Thomson & Bennett, LLC; Roger D. Emerson; Seth J. Niemi

(57) ABSTRACT

A method for path planning, an automatic gardening device, and a computer program product are provided. The method includes: receiving a preset travel direction in a work region; dividing the work region into a plurality of subregions; determining, for each of the subregions, an actual planned direction in the subregion from the preset travel direction and a recommended planned direction in the subregion, and determining a local planned path corresponding to the subregion based on the actual planned direction, wherein a path of traversing the subregion along the recommended planned direction has a shortest length; acquiring a moving sequence between the subregions; and determining a global planned path of the work region based on the local planned path of each of the subregions and the moving sequence between the subregions.

14 Claims, 7 Drawing Sheets

(56) References Cited

FOREIGN PATENT DOCUMENTS

| CN | 113359743 A | 9/2021 |
| EP | 2446725 A1 | 5/2012 |
| EP | 3494769 A1 | 6/2019 |

OTHER PUBLICATIONS

Rik B\Ahnemann et al: "Revisiting Boustrophedon Coverage Path Planning as a Generalized Traveling Salesman Problem", arxiv.org, Cornell University Library, 201 Olin Library Cornell University Ithaca, NY 14853, Jul. 22, 2019 (Jul. 22, 2019), XP081998993, DOI: 10.1007/978-981-15-9460-1_20 *abstract; figures 1b,2,4-7 * *p. 5-p. 9 * *p. 12 *.

* cited by examiner

METHOD FOR PATH PLANNING, AUTOMATIC GARDENING DEVICE, AND COMPUTER PROGRAM PRODUCT

CROSS-REFERENCE TO RELATED APPLICATIONS

This application claims the priority benefit to Chinese Patent Application No. 202210029314.9, entitled "A METHOD FOR PATH PLANNING, DEVICE, AUTOMATIC GARDENING DEVICE, AND COMPUTER PROGRAM PRODUCT" filed on Jan. 11, 2022. The disclosure of the aforementioned application is hereby expressly incorporated by reference in its entirety.

TECHNICAL FIELD

The present disclosure relates to the technical field of smart devices, and in particular to, a method for path planning, an automatic gardening device, and a computer program product.

BACKGROUND

An existing automatic gardening device, such as an automatic mower, can automatically mow grasses autonomously or uncontrolledly, thereby reducing time occupation of a user, and reducing repetitive work of the user.

An existing automatic mower generally plans an appropriate mowing direction and an appropriate mowing path based on a shape of its work region (such as a shape of a lawn). However, a problem with the mowing direction and the mowing path planned by the existing automatic mower is that: after repeated mowing operations, a relatively clear pressed mark and sign by the wheels of the mower are left on the lawn, thereby easily affecting the lawn growth and vitality.

In order to solve this problem, some existing solutions utilize a mowing direction remotely specified by the user. While this solution can solve the problem of prolonged mowing in a single direction to some extent, unreasonable mowing directions are easily specified by the user, and many short path segments tend to exist in the planned mowing path, thereby resulting in many turns of the automatic mower, and affecting the efficiency of the automatic mower.

SUMMARY

In view of the above problems, embodiments of the present disclosure are presented to provide a method for path planning, an automatic gardening device, and a computer program product, to at least solve the problem of poor effects of work path planning of existing automatic gardening devices.

One or more embodiments of the present disclosure provide a method for path planning, including: receiving a preset travel direction in a work region; dividing the work region into a plurality of subregions; determining, for each of the subregions, an actual planned direction in the subregion from the preset travel direction and a recommended planned direction in the subregion, and determining a local planned path corresponding to the subregion based on the actual planned direction, where a path of traversing the subregion along the recommended planned direction has a shortest length; acquiring a moving sequence between the subregions; and determining a global planned path of the work region based on the local planned path of each of the subregions and the moving sequence between the subregions.

According to another aspect of the present disclosure, a method for path planning is provided, including: receiving a preset travel direction in a work region; dividing the work region into a plurality of subregions; determining, for each of the subregions, an actual planned direction in the subregion from the preset travel direction and a recommended planned direction in the subregion, and determining a local planned path corresponding to the subregion based on the actual planned direction, where a travel duration of traversing the subregion along the recommended planned direction is shortest; acquiring a moving sequence between the plurality of subregions; and determining a global planned path of the work region based on the local planned path of each of the subregions and the moving sequence between the plurality of subregions.

According to another aspect of the present disclosure, an apparatus for path planning is provided, including: a first receiving module configured to receive a preset travel direction in a work region; a first dividing module configured to divide the work region into a plurality of subregions; a first determining module configured to determine, for each of the subregions, an actual planned direction in the subregion from the preset travel direction and a recommended planned direction in the subregion, and determine a local planned path corresponding to the subregion based on the actual planned direction, where a path of traversing the subregion along the recommended planned direction has a shortest length; a first acquiring module configured to acquire a moving sequence between the plurality of subregions; and a second determining module configured to determine a global planned path of the work region based on the local planned path of each of the subregions and the moving sequence between the plurality of subregions.

According to another aspect of the present disclosure, an apparatus for path planning is provided, comprising: a second receiving module configured to receive a preset travel direction in a work region; a second dividing module configured to divide the work region into a plurality of subregions; a third determining module configured to determine, for each of the subregions, an actual planned direction in the subregion from the preset travel direction and a recommended planned direction in the subregion, and determine a local planned path corresponding to the subregion based on the actual planned direction, where a travel duration of traversing the subregion along the recommended planned direction is shortest; a second acquiring module configured to acquire a moving sequence between the plurality of subregions; and a fourth determining module configured to determine a global planned path of the work region based on the local planned path of each of the subregions and the moving sequence between the plurality of subregions.

According to another aspect of the present disclosure, an automatic gardening device is provided, comprising a controller configured to execute the above method for path planning.

According to another aspect of the present disclosure, a computer program product is provided, comprising a computer instruction, the computer instruction instructing a computing device to execute the above method for path planning.

In the present embodiment, when the global planned path of the work region is determined, the work region may be divided into one or more than one subregion, and the actual planned direction may be selected from the preset travel direction and the recommended planned direction for at least one subregion, thereby effectively avoiding the problem that the moving efficiency will be significantly reduced when the preset travel direction is poor, determining different actual planned directions in different subregions, and solving the problem of excessively pressed mark caused by prolonged planning along a given planned direction, thus achieving both high efficiency and favorable safety.

BRIEF DESCRIPTION OF THE DRAWINGS

To more clearly describe the technical solutions of the embodiments of the present disclosure or existing technologies, the accompanying drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

DETAILED DESCRIPTION OF EMBODIMENTS

To cause those skilled in the art to better understand the solutions in the present disclosure, the technical solutions in the embodiments of the present disclosure will be clearly and completely described below with reference to the accompanying drawings in the embodiments of the present disclosure. Apparently, the described embodiments are some embodiments, rather than all embodiments, of the present disclosure. All other embodiments obtained by those of ordinary skills in the art based on the embodiments of the present disclosure without making creative work are encompassed within the scope of protection of the present disclosure.

For the convenience of description and understanding, before the description of the method, a structure and a working scenario of an automatic gardening device are briefly described as follows:

In the present embodiment, the automatic gardening device may be an automatic mower. Of course, in other embodiments, the automatic gardening device may also be other appropriate devices. This is not limited.

The automatic gardening device at least comprises a positioning module, a moving module, and a control module, where the positioning module is configured to determine a pose of the automatic gardening device in an environment. The moving module is configured to drive the automatic gardening device to move. The control module may be connected to the positioning module and the moving module respectively, and control the moving module to work based on the pose determined by the positioning module. In addition, the automatic gardening device may further comprise other modules, such as a cutting module, based on different requirements.

The control module not only can be connected to the above modules, but also can be connected to a display device, such as a smart phone, a PAD, a smart watch, or a computer. The automatic gardening device is, for example, an automatic mower.

An implementation process of the method is illustrated as follows:

Embodiment I

Figure 1A:
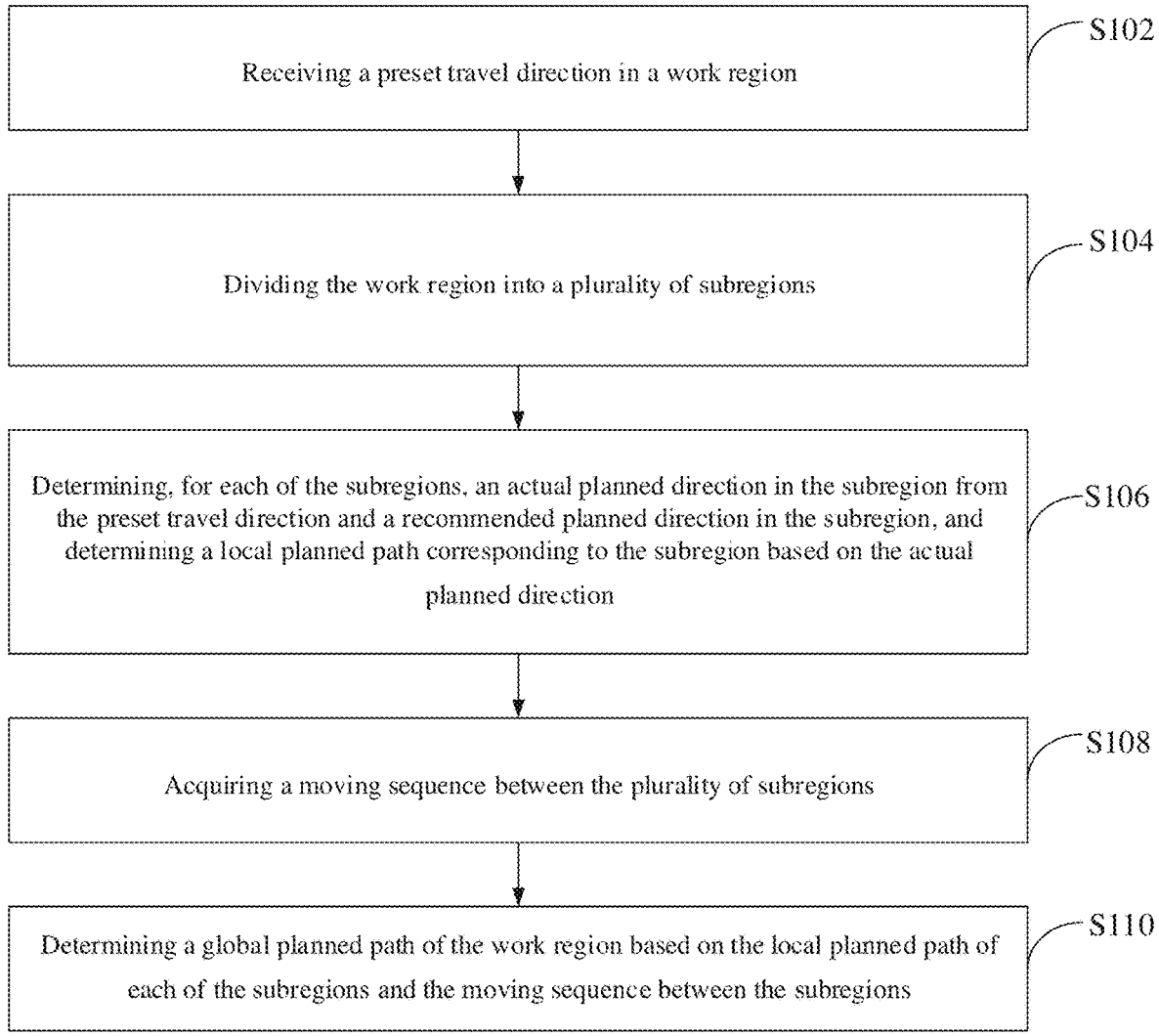
FIG. 1A is a flowchart of steps of a method for path planning provided in Embodiment I of the present disclosure.

By referring to FIG. 1A, a schematic flow chart of steps of a method in Embodiment I of the present disclosure is shown.

The method includes the following steps:

Step S102: receiving a preset travel direction in a work region.

The preset travel direction may be a better direction computed automatically, or may be a direction determined based on a selection of a user. Taking the automatic mower as an example, the preset travel direction may be a mowing direction automatically computed in accordance with an algorithm.

In the present embodiment, the user may decide whether to change the preset travel direction (i.e., the mowing direction) based on the situation of the lawn within the work region, thereby solving the problem that a pressed mark is easily left on the lawn and the lawn vitality is easily affected, which is resulted from that mowing is performed along the same mowing direction for a long period of time.

Step S104: dividing the work region into a plurality of subregions.

In order to guarantee that the automatic gardening device can traverse the whole work region when moving along the planned path, so as to guarantee the working effects, in a feasible implementation, the work region is divided based on the preset travel direction by integrating boundary information of the work region and boundary information of an obstacle, so that the subregions divided from the work region do not comprise an obstacle, thereby guaranteeing better path planning, reducing the number of turns on the planned path, and improving the efficiency of the automatic gardening device.

Of course, in other embodiments, the work region may be divided in other ways to obtain subregions. This is not limited in the present embodiment.

Figure 1B:
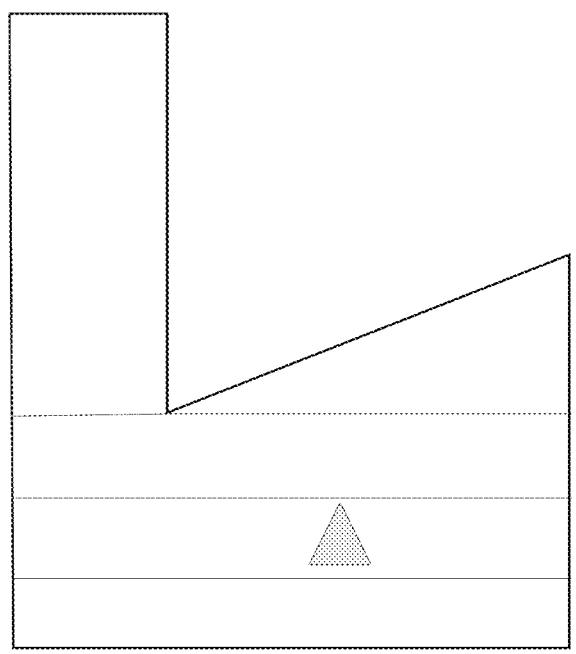
FIG. 1B is a schematic diagram of subregions in Embodiment I of the present disclosure.

An example dividing method may be: determining non-traversable grids in the work region based on the boundary information of the work region and the boundary information of the obstacle, scanning the work region following the preset travel direction, and dividing the work region into one or more than one subregion based on scanned interconnected traversable grids. A schematic diagram of subregions is as shown in FIG. 1B. A gray portion in the figure represents an obstacle, and a black thick line represents a boundary of the work region.

Step S106: determining, for each of the subregions, an actual planned direction in the subregion from the preset travel direction and a recommended planned direction in the subregion, and determining a local planned path corresponding to the subregion based on the actual planned direction. A corresponding local planned path may be planned for each subregion, to guarantee that the local planned path can traverse the subregion with high moving efficiency. In order to avoid the problem that the moving efficiency is excessively low when the automatic gardening device moves along the local planned path planned following an unreasonable preset travel direction, in the present embodiment, for each subregion, at least one first local path is planned following the recommended planned direction in the subregion, at least one second local path is planned based on the preset travel direction, and then the actual planned direction in the subregion is determined based on a path length of the first local path and a path length of the second local path, thus not only guaranteeing the moving efficiency along the finally planned path, but also avoiding the lawn vulnerability to damage by a given mowing direction along each planned path.

In the present embodiment, a path of traversing the subregion along the recommended planned direction has a shortest length. A feasible approach of determining the recommended planned direction is: traversing, with a direction parallel to each side of the subregion as a candidate planned direction, the subregion respectively following each of the candidate planned directions, to obtain a plurality of first local paths; and determining a candidate planned direction corresponding to the first local path with the shortest length of the path of traversing the subregion for use as the recommended planned direction.

The subregion is, e.g., a rectangle, which includes a long side and a short side. A direction parallel to an extension direction of the long side is selected for use as the candidate planned direction, and then the subregion is traversed by boustrophedon or other path planning approaches, to obtain a plurality of first local paths (different first local planned paths may have different starting points and ending points). A direction parallel to an extension direction of the short side is selected for use as another candidate planned direction, and then a plurality of first local paths is determined following the candidate planned direction. For these first local paths, the candidate planned direction corresponding to the first local path with the shortest path length is selected for use as the recommended planned direction.

If more than two first local paths have the same path length, but correspond to different candidate planned directions, one of them may be optionally selected for use as the recommended planned direction.

Step S108: acquiring a moving sequence between the plurality of subregions.

The moving sequence between the plurality of subregions may be combined randomly. If there are 3 subregions, which are denoted as subregions 1, 2, and 3 respectively, the moving sequence may be, e.g., "1-2-3" or "3-1-2," which is not enumerated here.

Step S110: determining a global planned path of the work region based on the local planned path of each of the subregions and the moving sequence between the plurality of subregions.

After the corresponding local planned path is determined for each subregion, in order to guarantee the moving efficiency and avoid excessively low moving efficiency caused by too many turns, an appropriate moving sequence combination may be determined from a moving sequence combination of different subregions, and the global planned path of the work region may be determined based on the appropriate moving sequence and the local planned path of the subregions.

The appropriate moving sequence may be determined by traversing various moving sequences, or by other appropriate approaches. This is not limited.

In the present embodiment, when the global planned path of the work region is determined, the work region may be divided into one or more than one subregion, and the actual planned direction may be selected from the preset travel direction and the recommended planned direction for at least one subregion, thereby effectively avoiding the problem that the moving efficiency will be significantly reduced when the preset travel direction is poor, determining different actual planned directions in different subregions, and solving the problem of excessively pressed mark caused by the mowing path being planned along the tame planned direction for a long period of time, thus achieving both high efficiency and favorable safety.

Embodiment II

Figure 2A:
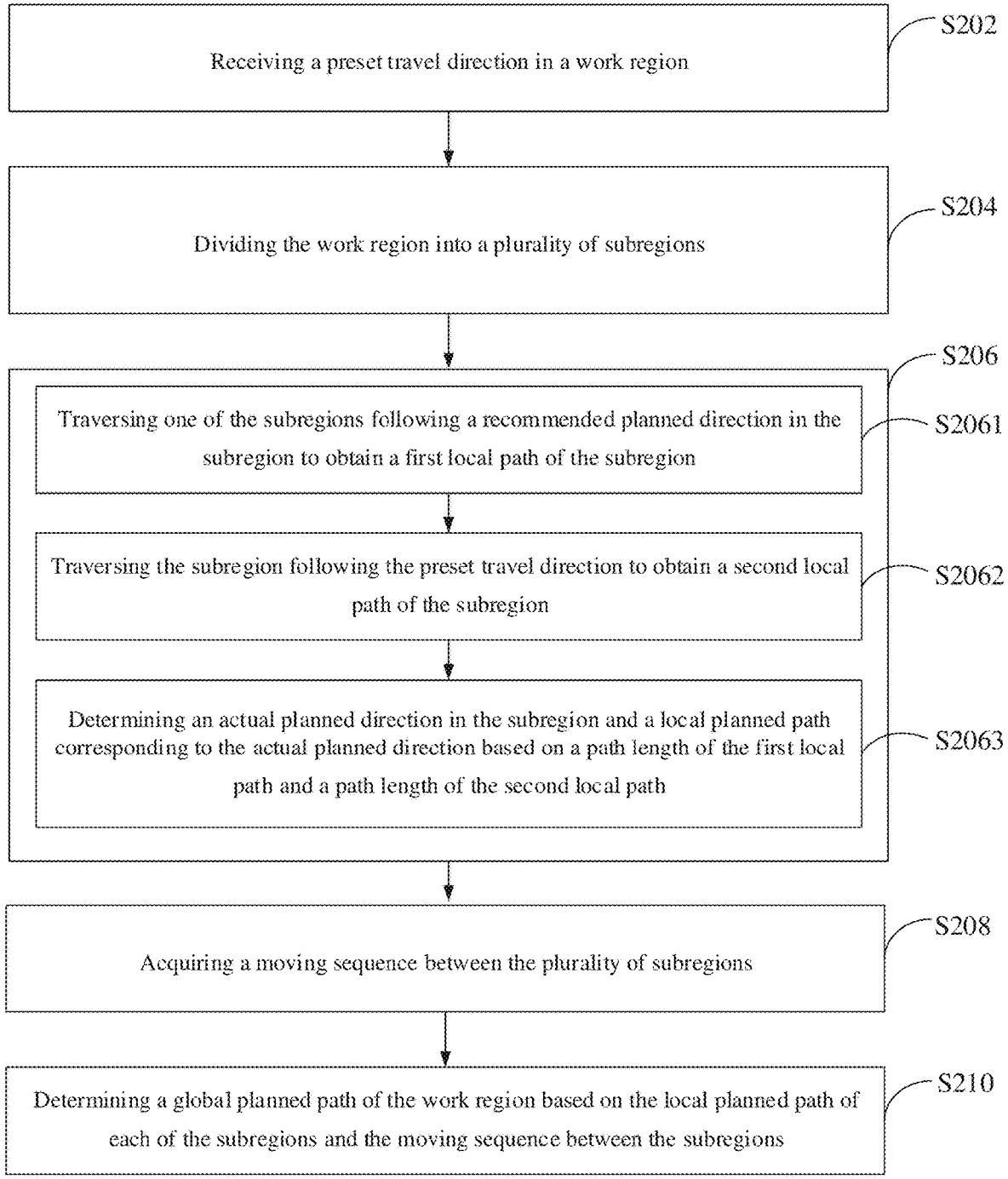
FIG. 2A is a flowchart of steps of a method for path planning provided in Embodiment II of the present disclosure.

By referring to FIG. 2A, a flow chart of steps of a method in Embodiment II of the present disclosure is shown.

In the present embodiment, the method includes the following steps:

Step S202: receiving a preset travel direction in a work region.

In a feasible implementation, in order to improve the intellectuality, adaptability, and configurability, step S202 may be implemented as follows:

Process A1: sending recommendation information to a display device to instruct the display device to display a recommended planned direction to a user.

The display device may be a device connected with data of an automatic gardening device, e.g., a smart terminal (such as a smart phone or a PAD), a smart TV, or a smart speaker with a screen, or an operable display screen carried on the automatic gardening device (the display screen may be fixed on the main body of the automatic gardening device, or may be installed on the main body of the automatic gardening device in a detachable manner. This is not limited).

In a planning process, a better recommended planned direction in the work region may be determined based on boundary information of the work region and boundary information of an obstacle, then the recommended planned direction and a corresponding path in the recommended planned direction are carried in the recommendation information, and the recommendation information is sent to the display device, which displays the recommended planned direction and the corresponding path thereof to the user.

It should be noted that the boundary information of the work region and the boundary information of the obstacle may be acquire by visual SLAM mapping or other appropriate approaches using the automatic gardening device.

Figure 2B:
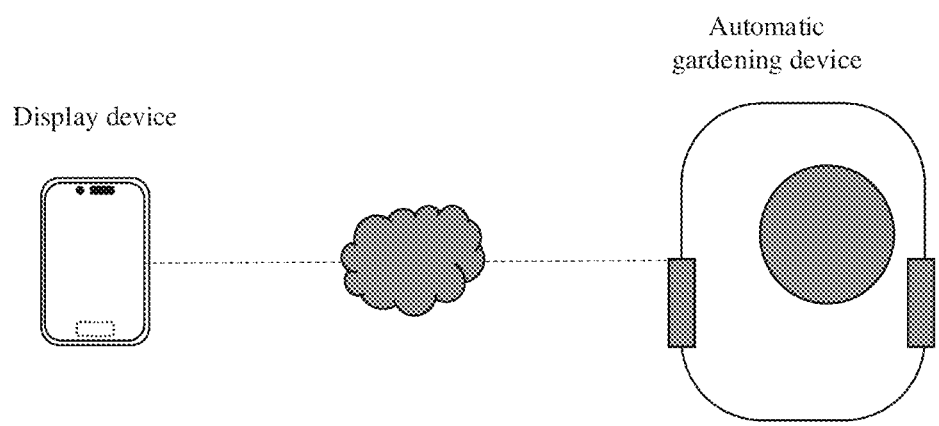
FIG. 2B is a schematic diagram of communication between a display device assembly and an automatic gardening device in Embodiment II of the present disclosure.

Taking an automatic mower as an example, the automatic mower may be equipped with a camera. The automatic mower collects an image of the work region when moving in the work region (such as a lawn of the user), and establishes the boundary information of the work region and the boundary information of the obstacle in the work region by visual SLAM based on the image. After mapping is completed, the boundary information of the work region and the boundary information of the obstacle may be visualized, and the visualization result may be sent to the display device to show a map of the work region to the user. A schematic diagram of a connection between the automatic gardening device and the display device is as shown in FIG. 2B.

In the present embodiment, the recommended planned direction may be determined as follows: determining a smallest rectangle that can cover the work region based on the boundary information of the work region, planning a path in a direction of a long side of the smallest rectangle and a path in a direction of a short side of the smallest rectangle respectively, and selecting a direction corresponding to a path with a shortest travel duration (or a shortest travel path) for use as the recommended planned direction.

The user can view the recommended planned direction and the corresponding path thereof through the display device. If the user thinks that the recommended planned direction is consistent with the actual planned direction which is used method for a long period of time, a pressed mark may be left or the life safety of the lawn may be easily affected, and the user may set a planned direction by operating the display device. The display device receives a modification operation of the user, and determines the planned direction selected by the user based on the modification operation for use as the preset travel direction, and generates a control instruction accordingly.

If the user thinks that the recommended planned direction is usable, the user may confirm the recommended planned direction on the display device. The display device uses the recommended planned direction as the preset travel direction, and generates the corresponding control instruction.

Process B1: receiving a control instruction in response to the recommendation information, where the control instruction carries information of a preset travel direction determined by a modification operation or a confirmation operation of the user on the recommended planned direction displayed in the display device.

The automatic gardening device receives the control instruction, and determines the preset travel direction based on the control instruction. If the user adjusts the recommended planned direction, the control instruction is determined based on the modification operation of the user. If the user does not adjust the recommended planned direction, the control instruction is determined based on the confirmation operation of the user.

Process C1: determining the preset travel direction based on the control instruction.

By processing the control instruction, the preset travel direction is analyzed therefrom. If the user modifies the recommended planned direction, the preset travel direction is the planned direction adjusted by the user. If the user does not modify the recommended planned direction, the preset travel direction is the recommended planned direction.

Step S204: dividing the work region into a plurality of subregions.

In a feasible implementation, the work region may be decomposed to subregions by BCD (Boustrophedon Cellular Decomposition), which is a grid map-based decomposition method.

For example, step S204 may be implemented as: determining a traversion state of each grid in the work region based on the boundary information of the work region and the boundary information of the obstacle, setting the preset travel direction as a scanning direction in the work region, and decomposing the work region to one or more than one subregion based on the scanning direction and the traversion state of each grid. Each subregion comprises no obstacle.

Figure 2C:
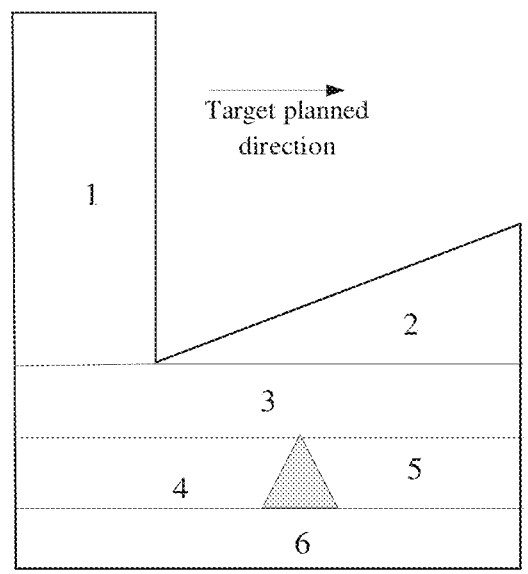
FIG. 2C is a schematic diagram of subregions in Embodiment II of the present disclosure.

A schematic diagram of subregions decomposed from the work region is as shown in FIG. 2C. It should be noted that while a sequence of the subregions is annotated in the figure, it does not represent a moving sequence between the subregions.

In other embodiments, the work region may be divided into subregions in other appropriate ways. This is not limited.

Step S206: determining, for each of the subregions, an actual planned direction in the subregion from the preset travel direction and the recommended planned direction in the subregion, and determining a local planned path corresponding to the subregion based on the actual planned direction.

In a feasible implementation, step S206 may be implemented for each subregion through the following substeps:

Substep S2061: traversing the subregion following the recommended planned direction in the subregion to obtain a first local path of the subregion.

In an example, substep S2061 may be implemented as follows:

Process A2: using a direction parallel to each side of the subregion as a candidate planned direction.

The subregion is a polygon, such as a rectangle or a triangle, and an extension direction of each side may be used as a candidate planned direction. For example, the subregion is a rectangle including a long side and a short side. A direction parallel to the long side is used as one candidate planned direction, and a direction parallel to the short side is used as another candidate planned direction.

Process B2: traversing the subregion respectively in each of the candidate planned directions, to obtain a plurality of first local paths.

Figure 2D:
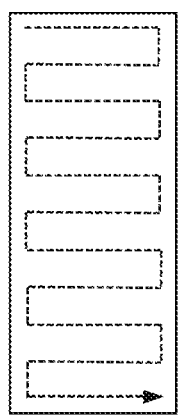
FIG. 2D is a schematic diagram of a first local path in a subregion in Embodiment II of the present disclosure.
Figure 2E:
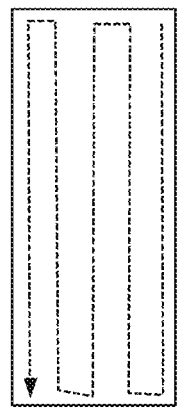
FIG. 2E is a schematic diagram of a first local path in another subregion in Embodiment II of the present disclosure.

For example, if the subregion is a rectangle, a long side and a short side of the rectangle may be used as a candidate planned direction respectively, and a corresponding first local path may be established, as shown in FIG. 2D and FIG. 2E. Specifically, the process of determining the first local path with the long side of the rectangle as the candidate planned direction may be as follows: establishing a path segment parallel to the long side of the rectangle with any one corner of the subregion as a starting point, turning when reaching a boundary of the subregion, and then continuing to establish a path segment parallel to the long side of the rectangle, and repeating the establishing a path segment until forming a path traversing the subregion for use as the first local path.

If the subregion is a triangle, each side of the triangle is used as a candidate planned direction, and a corresponding first local path is determined. The approach of determining the first local path is similar to the above process of determining the first local path with the long side of the rectangle as the candidate planned direction, so that the description will not be repeated.

When a shape of the subregion is another polygon, the determination process is similar, so that the description will not be repeated. It should be noted that when the subregion includes a plurality of corners, a plurality of first local paths with different starting points may be established in a given candidate planned direction.

Process C2: determining a candidate planned direction corresponding to the first local path with the shortest length of the path of traversing the subregion for use as the recommended planned direction, and acquiring a first local path corresponding to the recommended planned direction.

In an example, the process B2 may be implemented as: determining the candidate planned direction corresponding to the first local path with the shortest path length for use as the recommended planned direction, and acquiring the first local path corresponding to the recommended planned direction (there may be one or more than one first local path), thereby guaranteeing highest travelling efficiency and highest working efficiency of the first local path corresponding to the recommended planned direction.

Substep S2062: traversing the subregion following the preset travel direction to obtain a second local path of the subregion.

The second local path may be determined as follows: establishing a path segment parallel to the preset travel direction with any one corner of the subregion as a starting point, turning when reaching a boundary of the subregion, and then continuing to establish a path segment parallel to the preset travel direction, until traversing the subregion.

It should be noted that when the subregion includes a plurality of corners, a plurality of second local paths with different starting points may be established in a given preset travel direction.

Substep S2063: determining the actual planned direction in the subregion and a local planned path corresponding to the actual planned direction based on a path length of the first local path and a path length of the second local path.

In a feasible implementation, if the second local path is greater than or equal to a second set times as long as the first local path, the recommended planned direction corresponding to the first local path is used as the actual planned direction, and the first local path is used as the local planned path corresponding to the actual planned direction.

The second set times is, for example, 1.5. If the second local path is greater than 1.5 times as long as the first local path, it means that the current subregion is a narrow region, and a travelling efficiency of the preset travel direction selected by the user is excessively low. Therefore, the recommended planned direction is used as the actual planned direction, to guarantee the travelling efficiency.

Step S208: acquiring a moving sequence between the plurality of subregions.

The moving sequence between the plurality of subregions may be determined randomly.

Step S210: determining a global planned path of the work region based on the local planned path of each of the subregions and the moving sequence between the plurality of subregions.

In the present embodiment, in order to reduce the computing load, improve the computing efficiency, and guarantee that the global planned path with high travelling efficiency can be obtained, step S208 may be implemented as follows:

Process A3: establishing a candidate global planned path based on the moving sequence of the subregions and the local planned paths of the subregions.

For example, taking the above schematic diagram of subregion division as an example, a local planned path is selected from local planned paths of each of the subregions in a sequence of a subregion moving sequence "1-2-3-4-5-6," and the selected local planned paths are spliced following the above moving sequence to form the candidate global planned path.

Process B3: computing a path length of the candidate global planned path.

Process C3: determining whether to update at least one of the moving sequence of the subregions and the local planned paths of the subregions based on the path length of the candidate global path, determining, if updating at least one of the moving sequence of the subregions and the local planned paths of the subregions, a renewed candidate global planned path based on the updated result, and continuing to execute the computing the path length of the candidate global planned path, until a termination condition is satisfied.

If the path length satisfies a set threshold (which may be determined as required, and is not limited), the candidate global planned path is used as the global planned path of the work region.

Alternatively, if the path length does not satisfy the set threshold, at least one of the moving sequence of the subregions and the local planned paths of the subregions may be updated based on a current candidate global path. For example, the moving sequence is updated to "1-3-4-5-6-2," or a local planned path with another starting point is selected.

A renewed global planned path is determined based on the renewed moving sequence and the local planned paths of the subregions, and then a path length of the renewed global planned path is computed; if the path length satisfies the set threshold, the termination condition is satisfied; and otherwise, the termination condition is not satisfied, and at least one of the moving sequence and the local planned paths may be re-updated, which are repeatedly executed until the termination condition is satisfied.

The termination condition not only may be satisfying the set threshold, but also may be satisfying a set number of cycles (such as 50 cycles), or traversing a combination of all moving sequences and local planned paths.

Figure 2F:
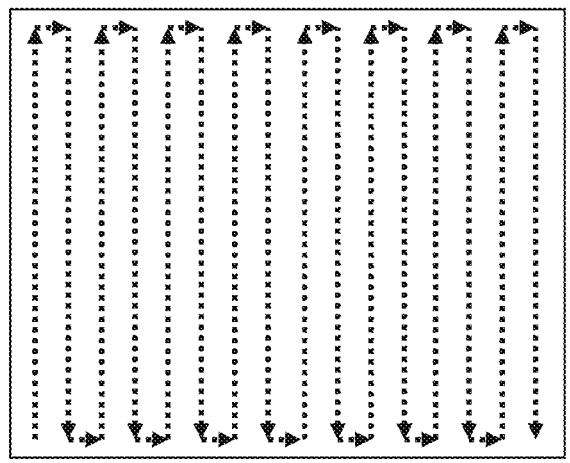
FIG. 2F is a schematic diagram of a global planned path in Embodiment II of the present disclosure.
Figure 2G:
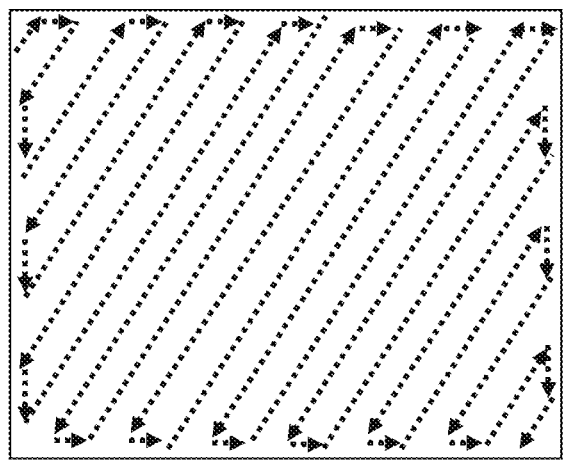
FIG. 2G is a schematic diagram of another global planned path in Embodiment II of the present disclosure.

The acquired global planned path may be as shown in FIG. 2F or FIG. 2G.

In this way, an optimal global planned path may be determined. On the one hand, the user may change and customize a mowing direction by himself, thus solving the grass damage caused by prolonged mowing in a single direction. On the other hand, an optimal mowing direction may be recommended to the user, thus improving the mowing efficiency, and improving the comprehensive use effects.

Embodiment III

Figure 3:
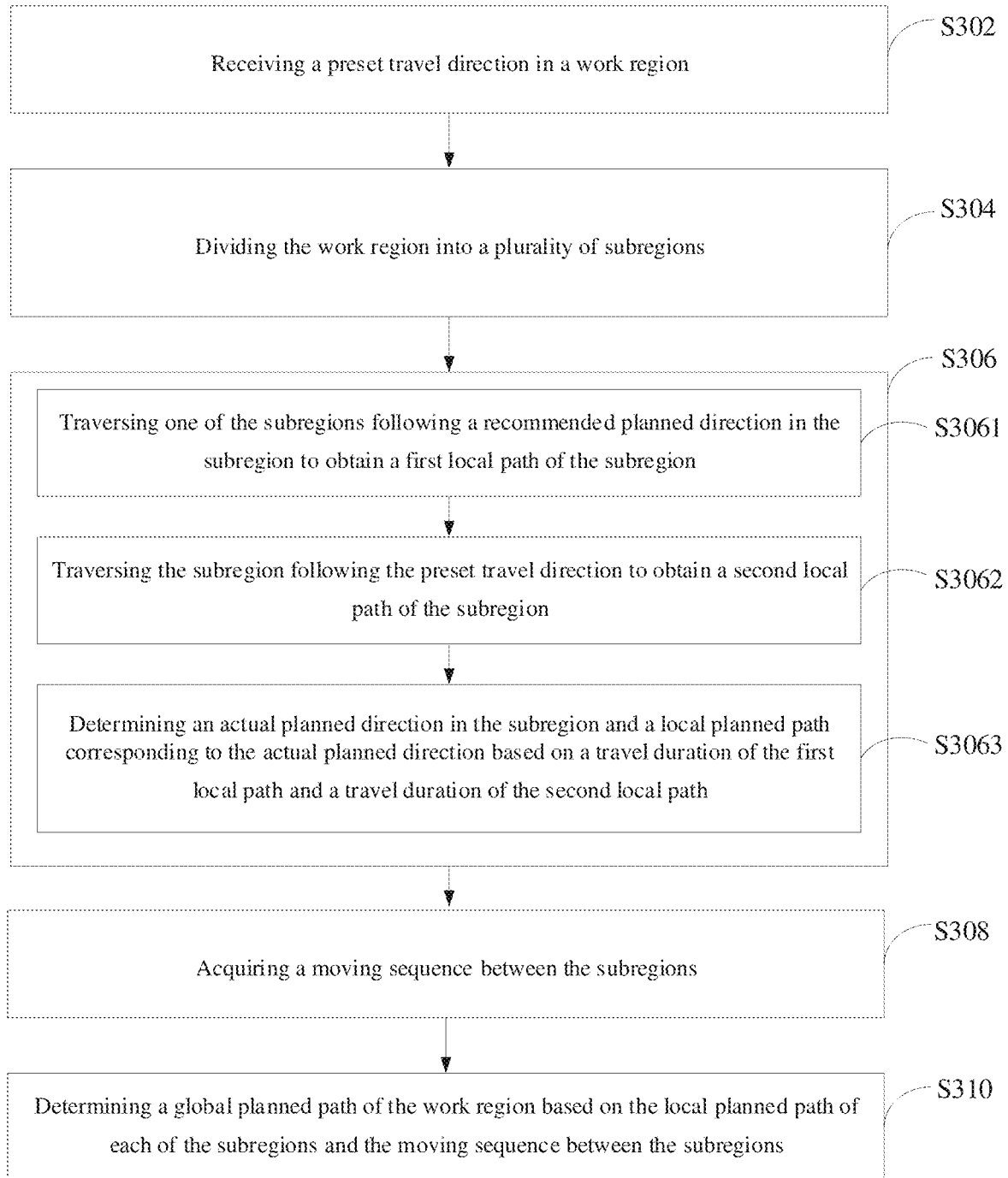
FIG. 3 is a schematic flowchart of steps of a method for path planning in Embodiment III of the present disclosure.

By referring to FIG. 3, a schematic flow chart of steps of a method for path planning in Embodiment III of the present disclosure is shown.

The method includes the following steps:

Step S302: receiving a preset travel direction in a work region.

The preset travel direction in the work region may be a mowing direction selected by a user or a better mowing direction automatically computed in accordance with an algorithm. The approach of determining the preset travel direction may be the same as that in the above Embodiment I or II, so that the description will not be repeated.

Step S304: dividing the work region into a plurality of subregions.

The subregion division approach may be the same as that in the above Embodiment I or II, so that the description will not be repeated.

Step S306: determining, for each of the subregions, an actual planned direction in the subregion from the preset travel direction and the recommended planned direction in the subregion, and determining a local planned path corresponding to the subregion based on the actual planned direction.

In a feasible implementation, step S306 includes the following substeps:

Substep S3061: traversing the subregion following the recommended planned direction in the subregion to obtain a first local path of the subregion.

In the present embodiment, a travel duration of traversing the subregion along the recommended planned direction is shortest. The travel duration is determined based on a rated acceleration, a rated speed, and a rated angular speed of an automatic gardening device.

Substep S3061 is implemented as follows:

Process A4: traversing, with a direction parallel to each side of the subregion as a candidate planned direction, the subregion respectively following each of the candidate planned directions, to obtain a plurality of first local paths.

For example, the subregion is a triangle, a direction parallel to each side of the triangle is used as a candidate planned direction respectively, and a first local path of traversing the subregion is planned by boustrophedon or other approaches. One or more than one first local path may be obtained for a given candidate planned direction. Different first local planned paths have different starting points and ending points.

Process B4: determining a candidate planned direction corresponding to the first local path with the shortest travel duration of the path of traversing the subregion for use as the recommended planned direction, and acquiring a first local path corresponding to the recommended planned direction.

If travel durations of the plurality of first local paths are identical, and are shortest, and candidate planned directions corresponding to these first local paths are different, one of these candidate planned directions may be randomly selected therefrom for use as the recommended planned direction; or, the recommended planned direction may be determined based on a recorded number of times of using the candidate planned direction. This is not limited.

Substep S3062: traversing the subregion following the preset travel direction to obtain a second local path of the subregion.

For example, the path traversing the subregion is determined following the preset travel direction in accordance with a boustrophedon algorithm or other path planning algorithms, for use as the second local path. It should be noted that a plurality of second local planned paths may be planned following the preset travel direction with different starting points and ending points.

Substep S3063: determining the actual planned direction in the subregion and a local planned path corresponding to the actual planned direction based on a travel duration of the first local path and a travel duration of the second local path.

In a feasible implementation, if the travel duration of the second local path is greater than or equal to a first set times as long as the travel duration of the first local path, the recommended planned direction corresponding to the first local path is used as the actual planned direction, and the first local path is used as the local planned path corresponding to the actual planned direction.

For example, the first set times may be 1.5 times. If the travel duration of the second local path is 1.5 times as long as the travel duration of the first local path, it means that the travel duration of the second local path planned in the preset travel direction selected by the user is excessively long, and will adversely affect the mowing efficiency. Therefore, the recommended planned direction may be used as the actual planned direction.

Otherwise, if the travel duration of the second local path is less than or equal to the first set times as long as the travel duration of the first local path, the preset travel direction corresponding to the second local path may be used as the actual planned direction, and the second local path may be used as the local planned path corresponding to the actual planned direction.

Step S308: acquiring a moving sequence between the plurality of subregions.

The moving sequence between the subregions may be determined randomly. If there are 3 subregions, the moving sequence may be, e.g., "1-2-3" or "2-3-1," which is not enumerated here.

Step S310: determining a global planned path of the work region based on the local planned path of each of the subregions and the moving sequence between the subregions.

In a feasible implementation, step S310 may be implemented as follows:

Process A5: establishing a candidate global planned path based on the moving sequence of the subregions and the local planned paths of the subregions.

For example, a moving sequence of the subregions is "1-2-3." A local planned path is selected from local planned paths of each of the subregions, and the selected local planned paths are spliced following the above moving sequence to form the candidate global planned path.

Process B5: computing a travel duration of the candidate global planned path.

In the present embodiment, the travel duration is determined based on the rated acceleration, the rated speed, and the rated angular speed of the automatic gardening device.

Process C5: determining whether to update at least one of the moving sequence of the subregions and the local planned paths of the subregions based on the travel duration of the candidate global path.

If the travel duration of the candidate global path is greater than a set value (the set value may be determined based on an area of the subregion, for example, the set value is, e.g., 5 minutes, if the area is less than or equal to 5 square meters), it means that the travel duration of the candidate global path is excessively long, and the path sequence or the selected local planned path may be updated to obtain a better candidate global path.

If the travel duration of the candidate global path is less than or equal to the set value, the candidate global path may be determined as a final global path, thus completing path planning.

Process D5: determining, if updating at least one of the moving sequence of the subregions and the local planned paths of the subregions, a renewed candidate global planned path based on an updated result, and continuing to execute the computing the travel duration of the candidate global planned path, until a termination condition is satisfied.

When the candidate global planned path is updated, a renewed path sequence may be determined or a renewed local planned path may be selected, or the two may be combined, to form a renewed candidate global planned path, and then process B5 is returned to continue to compute the travel duration of the renewed candidate global path, until the termination condition is satisfied.

The termination condition may be a combination of traversing all path sequences and local planned paths, or satisfying a set number of cycles.

In this way, an optimal global planned path may be determined. On the one hand, the user may change and customize a mowing direction by himself, thus solving the grass damage caused by prolonged mowing in a single direction. On the other hand, an optimal mowing direction may be recommended to the user, thus improving the mowing efficiency, and improving the comprehensive use effects.

Embodiment IV

Figure 4:
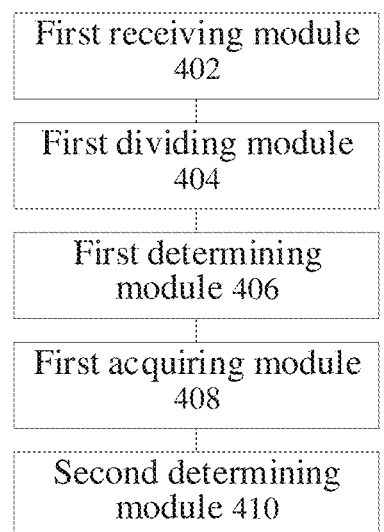
FIG. 4 is a structural block diagram of an apparatus for path planning in Embodiment IV of the present disclosure.

By referring to FIG. 4, a structural block diagram of an apparatus for path planning in Embodiment III of the present disclosure is shown.

The apparatus comprises:
a first receiving module 402 configured to receive a preset travel direction in a work region;
a first dividing module 404 configured to divide the work region into a plurality of subregions;
a first determining module 406 configured to determine, for each of the subregions, an actual planned direction in the subregion from the preset travel direction and a recommended planned direction in the subregion, and determine a local planned path corresponding to the subregion based on the actual planned direction, where a path of traversing the subregion along the recommended planned direction has a shortest length;
a first acquiring module 408 configured to acquire a moving sequence between the plurality of subregions; and
a second determining module 410 configured to determine a global planned path of the work region based on the local planned path of each of the subregions and the moving sequence between the subregions.

Alternatively, the first determining module 406 is configured to traverse the subregion following the recommended planned direction in the subregion to obtain a first local path of the subregion; traverse the subregion following the preset travel direction to obtain a second local path of the subregion; and determine the actual planned direction in the subregion and the local planned path corresponding to the actual planned direction based on the path length of the first local path and the path length of the second local path.

Alternatively, the first determining module 406 is configured to traverse, with a direction parallel to each side of the subregion as a candidate planned direction, the subregion respectively following each of the candidate planned directions, to obtain a plurality of first local paths; and determine a candidate planned direction corresponding to the first local path with the shortest length of the path of traversing the subregion for use as the recommended planned direction, and acquire a first local path corresponding to the recommended planned direction.

Alternatively, the first determining module 406 is configured to use, if the second local path is greater than or equal to a second set times as long as the first local path, the recommended planned direction corresponding to the first local path as the actual planned direction, and use the first local path as the local planned path corresponding to the actual planned direction.

Alternatively, the second determining module 410 is configured to establish a candidate global planned path based on the moving sequence of the subregions and the local planned paths of the subregions; compute a path length of the candidate global planned path; determine whether to update at least one of the moving sequence of the subregions and the local planned paths of the subregions based on the path length of the candidate global path, determine, if updating at least one of the moving sequence of the subregions and the local planned paths of the subregions, a renewed candidate global planned path based on an updated result, and continue to execute the computing the path length of the candidate global planned path, until a termination condition is satisfied.

Alternatively, the first receiving module 402 is configured to send recommendation information to a display device to instruct the display device to display the recommended planned direction to a user; receive a control instruction in response to the recommendation information, where the control instruction carries information of a preset travel direction determined by a modification operation or a confirmation operation of the user on the recommended planned direction displayed in the display device; and determine the preset travel direction based on the control instruction.

The apparatus can achieve the corresponding effects of the above method, so that the description will not be repeated.

Embodiment V

Figure 5:
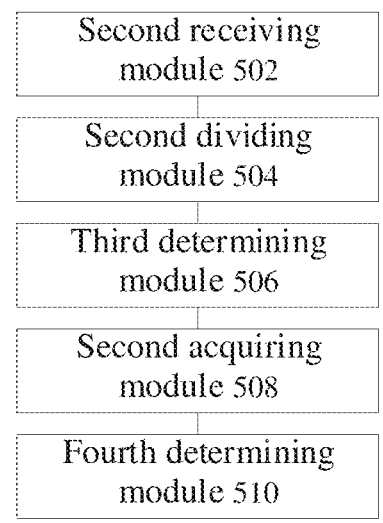
FIG. 5 is a structural block diagram of an apparatus for path planning in Embodiment V of the present disclosure.

By referring to FIG. 5, a structural block diagram of an apparatus for path planning in Embodiment V of the present disclosure is shown.

The apparatus comprises:
a second receiving module 502 configured to receive a preset travel direction in a work region;
a second dividing module 504 configured to divide the work region into a plurality of subregions;
a third determining module 506 configured to determine, for each of the subregions, an actual planned direction in the subregion from the preset travel direction and a recommended planned direction in the subregion, and determine a local planned path corresponding to the subregion based on the actual planned direction, where a travel duration of traversing the subregion along the recommended planned direction is shortest;
a second acquiring module 508 configured to acquire a moving sequence between the plurality of subregions; and
a fourth determining module 510 configured to determine a global planned path of the work region based on the local planned path of the subregion and the moving sequence between the subregions.

Alternatively, the third determining module 506 is configured to traverse the subregion following the recommended planned direction in the subregion to obtain a first local path of the subregion; traverse the subregion following the preset travel direction to obtain a second local path of the subregion; and determine the actual planned direction in the subregion and the local planned path corresponding to the actual planned direction based on a travel duration of the first local path and a travel duration of the second local path.

Alternatively, the third determining module 506 is configured to traverse, with a direction parallel to each side of the subregion as a candidate planned direction, the subregion respectively following each of the candidate planned directions, to obtain a plurality of first local paths; and determine a candidate planned direction corresponding to the first local path with the shortest travel duration of the path of traversing the subregion for use as the recommended planned direction, and acquire a first local path corresponding to the recommended planned direction.

Alternatively, the third determining module 506 is configured to use, when the travel duration of the second local path is greater than or equal to a first set times as long as the travel duration of the first local path, the recommended planned direction corresponding to the first local path as the actual planned direction, and use the first local path as the local planned path corresponding to the actual planned direction.

Alternatively, the fourth determining module 510 is configured to establish a candidate global planned path based on the moving sequence of the subregions and the local planned paths of the subregions; compute a travel duration of the candidate global planned path; determine whether to update at least one of the moving sequence of the subregions and the local planned paths of the subregions based on the travel duration of the candidate global path; determine, if updating at least one of the moving sequence of the subregions and the local planned paths of the subregions, a renewed candidate global planned path based on an updated result, and continue to execute the computing the travel duration of the candidate global planned path, until a termination condition is satisfied.

The apparatus can achieve the corresponding effects of the above method, so that the description will not be repeated.

Embodiment VI

In the present embodiment, an automatic gardening device is provided, comprising a controller configured to execute the above method for path planning.

Embodiment VII

In the present embodiment, a computer program product is provided, comprising a computer instruction, the computer instruction instructing a computing device to execute the above method for path planning.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical solutions of the present disclosure, instead of imposing any limitation on the present disclosure. Although the present disclosure has been described in detail with reference to the above embodiments, those with ordinary skills in the art should understand that: the technical solutions disclosed in the above embodiments may still be modified or a part of the technical features thereof may be replaced equivalently. These modifications and replacements are not intended to make the essence of corresponding technical solutions depart from the spirit and scope of the technical solutions of the embodiments of the present disclosure.

What is claimed is:

1. A method for path planning for an automatic gardening device, comprising:
   receiving a preset travel direction in a work region;
   dividing the work region into a plurality of subregions;
   determining, for each of the subregions, an actual planned direction in the subregion from the preset travel direction and a recommended planned direction in the subregion, and determining a local planned path corresponding to the subregion based on the actual planned direction, wherein a path of traversing the subregion along the recommended planned direction has a shortest length, or a travel duration of traversing the subregion along the recommended planned direction is shortest;
   acquiring a moving sequence between the plurality of subregions; and
   determining a global planned path of the work region for the automatic gardening device based on the local planned path of the each subregion and the moving sequence between the plurality of subregions, wherein the receiving the preset travel direction in the work region comprises:
   sending recommendation information to a display device to instruct the display device to display the recommended planned direction to a user;
   receiving a control instruction in response to the recommendation information, wherein the control instruction carries information of the preset travel direction determined by a modification operation or a confirmation operation of the user on the recommended planned direction displayed in the display device; and
   determining the preset travel direction based on the control instruction.

2. The method according to claim 1, wherein the determining, for each of the subregions, the actual planned direction in the subregion from the preset travel direction and the recommended planned direction in the subregion, and determining the local planned path corresponding to the subregion based on the actual planned direction comprises:
   traversing the subregion following the recommended planned direction in the subregion to obtain a first local path of the subregion;
   traversing the subregion following the preset travel direction to obtain a second local path of the subregion; and
   determining the actual planned direction and a local planned path corresponding to the actual planned direction in the subregion based on a path length of the first local path and a path length of the second local path.

3. The method according to claim 2, wherein:
the traversing the subregion following the recommended planned direction in the subregion to obtain the first local path of the subregion comprises:
traversing, with a direction parallel to each side of the subregion as a candidate planned direction, the subregion respectively following each of the candidate planned directions, to obtain a plurality of first local paths; and determining a candidate planned direction corresponding to the first local path with the shortest length of the path of traversing the subregion as the recommended planned direction, and acquiring a first local path corresponding to the recommended planned direction; or
the determining the actual planned direction in the subregion and the local planned path corresponding to the actual planned direction based on the path length of the first local path and the path length of the second local path comprises:
using, when the second local path is greater than or equal to a second set times as long as the first local path, the recommended planned direction corresponding to the first local path as the actual planned direction, and using the first local path as the local planned path corresponding to the actual planned direction.

4. The method according to claim 1, wherein the determining the global planned path of the work region based on the local planned path of the each subregion and the moving sequence between the plurality of subregions comprises:
establishing a candidate global planned path based on the moving sequence of the plurality of subregions and the local planned paths of the subregions;
computing a path length of the candidate global planned path; and
determining whether to update at least one of the moving sequence of the plurality of subregions and the local planned paths of the subregions based on the path length of the candidate global path, determining, when updating at least one of the moving sequence of the subregions and the local planned paths of the subregions, a renewed candidate global planned path based on an updated result, and continuing to execute the computing the path length of the candidate global planned path, until a termination condition is satisfied.

5. The method according to claim 1, wherein the determining, for each of the subregions, the actual planned direction in the subregion from the preset travel direction and the recommended planned direction in the subregion, and determining the local planned path corresponding to the subregion based on the actual planned direction comprises:
traversing the subregion following the recommended planned direction in the subregion to obtain a first local path of the subregion;
traversing the subregion following the preset travel direction to obtain a second local path of the subregion; and
determining the actual planned direction and a local planned path corresponding to the actual planned direction in the subregion based on a travel duration of the first local path and a travel duration of the second local path.

6. The method according to claim 5, wherein:
the traversing the subregion following the recommended planned direction in the subregion to obtain the first local path of the subregion comprises:
traversing, with a direction parallel to each side of the subregion as a candidate planned direction, the subregion respectively following each of the candidate planned directions, to obtain a plurality of first local paths; and
determining a candidate planned direction corresponding to the first local path with the shortest travel duration of the path of traversing the subregion for use as the recommended planned direction, and acquiring a first local path corresponding to the recommended planned direction; or
the determining the actual planned direction and the local planned path corresponding to the actual planned direction in the subregion based on the travel duration of the first local path and the travel duration of the second local path comprises:
using, when the travel duration of the second local path is greater than or equal to a first set times as long as the travel duration of the first local path, the recommended planned direction corresponding to the first local path as the actual planned direction, and
using the first local path as the local planned path corresponding to the actual planned direction.

7. The method according to claim 5, wherein the determining the global planned path of the working region based on the local planned path of the each subregion and the moving sequence between the plurality of subregions comprises:
establishing a candidate global planned path based on the moving sequence and the local planned paths of the of the plurality of subregions;
computing a travel duration of the candidate global planned path;
determining whether to update at least one of the moving sequence and the local planned paths of the plurality of subregions based on the travel duration of the candidate global path; and
determining, when at least one of the moving sequence and the local planned paths of the plurality of subregions are updated, a renewed candidate global planned path based on the updated result, and continuing to execute the computing the travel duration of the candidate global planned path, until a termination condition is satisfied.

8. An automatic gardening device, comprising a controller, comprising a computer, the controller configured to execute a method for path planning, the method comprising:
receiving a preset travel direction in a work region;
dividing the work region into a plurality of subregions;
determining, for each of the subregions, an actual planned direction in the subregion from the preset travel direction and a recommended planned direction in the subregion, and determining a local planned path corresponding to the subregion based on the actual planned direction, wherein a path of traversing the subregion along the recommended planned direction has a shortest length, or a travel duration of traversing the subregion along the recommended planned direction is shortest;
acquiring a moving sequence between the plurality of subregions; and
determining a global planned path of the work region based on the local planned path of the each subregion and the moving sequence between the plurality of subregions, wherein the receiving the preset travel direction in the work region comprises:
sending recommendation information to a display device to instruct the display device to display the recommended planned direction to a user;

receiving a control instruction in response to the recommendation information, wherein the control instruction carries information of the preset travel direction determined by a modification operation or a confirmation operation of the user on the recommended planned direction displayed in the display device; and determining the preset travel direction based on the control instruction.

9. The automatic gardening device according to claim 8, wherein the determining, for each of the subregions, the actual planned direction in the subregion from the preset travel direction and the recommended planned direction in the subregion, and determining the local planned path corresponding to the subregion based on the actual planned direction comprises:

traversing the subregion following the recommended planned direction in the subregion to obtain a first local path of the subregion;

traversing the subregion following the preset travel direction to obtain a second local path of the subregion; and determining the actual planned direction and a local planned path corresponding to the actual planned direction in the subregion based on a path length of the first local path and a path length of the second local path.

10. The automatic gardening device according to claim 9, wherein:

the traversing the subregion following the recommended planned direction in the subregion to obtain the first local path of the subregion comprises:

traversing, with a direction parallel to each side of the subregion as a candidate planned direction, the subregion respectively following each of the candidate planned directions, to obtain a plurality of first local paths; and determining a candidate planned direction corresponding to the first local path with the shortest length of the path of traversing the subregion as the recommended planned direction, and acquiring a first local path corresponding to the recommended planned direction; or the determining the actual planned direction in the subregion and the local planned path corresponding to the actual planned direction based on the path length of the first local path and the path length of the second local path comprises:

using, when the second local path is greater than or equal to a second set times as long as the first local path, the recommended planned direction corresponding to the first local path as the actual planned direction, and using the first local path as the local planned path corresponding to the actual planned direction.

11. The automatic gardening device according to claim 8, wherein the determining the global planned path of the work region based on the local planned path of the each subregion and the moving sequence between the plurality of subregions comprises:

establishing a candidate global planned path based on the moving sequence of the plurality of subregions and the local planned paths of the subregions;

computing a path length of the candidate global planned path; and determining whether to update at least one of the moving sequence of the plurality of subregions and the local planned paths of the subregions based on the path length of the candidate global path, determining, when updating at least one of the moving sequence of the subregions and the local planned paths of the subregions, a renewed candidate global planned path based on an updated result, and continuing to execute the computing the path length of the candidate global planned path, until a termination condition is satisfied.

12. The automatic gardening device according to claim 8, wherein the determining, for each of the subregions, the actual planned direction in the subregion from the preset travel direction and the recommended planned direction in the subregion, and determining the local planned path corresponding to the subregion based on the actual planned direction comprises:

traversing the subregion following the recommended planned direction in the subregion to obtain a first local path of the subregion;

traversing the subregion following the preset travel direction to obtain a second local path of the subregion; and determining the actual planned direction and a local planned path corresponding to the actual planned direction in the subregion based on a travel duration of the first local path and a travel duration of the second local path.

13. The automatic gardening device according to claim 12, wherein:

the traversing the subregion following the recommended planned direction in the subregion to obtain the first local path of the subregion comprises:

traversing, with a direction parallel to each side of the subregion as a candidate planned direction, the subregion respectively following each of the candidate planned directions, to obtain a plurality of first local paths; and determining a candidate planned direction corresponding to the first local path with the shortest travel duration of the path of traversing the subregion for use as the recommended planned direction, and acquiring a first local path corresponding to the recommended planned direction; or the determining the actual planned direction and the local planned path corresponding to the actual planned direction in the subregion based on the travel duration of the first local path and the travel duration of the second local path comprises:

using, when the travel duration of the second local path is greater than or equal to a first set times as long as the travel duration of the first local path, the recommended planned direction corresponding to the first local path as the actual planned direction, and using the first local path as the local planned path corresponding to the actual planned direction.

14. The automatic gardening device according to claim 12, wherein the determining the global planned path of the working region based on the local planned path of the each subregion and the moving sequence between the plurality of subregions comprises:

establishing a candidate global planned path based on the moving sequence and the local planned paths of the of the plurality of subregions;

computing a travel duration of the candidate global planned path;

determining whether to update at least one of the moving sequence and the local planned paths of the plurality of subregions based on the travel duration of the candidate global path; and determining, when at least one of the moving sequence and the local planned paths of the plurality of subregions are updated, a renewed candidate global planned path based on the updated result, and continuing to execute the computing the travel duration of the candidate global planned path, until a termination condition is satisfied.

\* \* \* \* \*